United States Patent

Matsumoto

[11] Patent Number: 5,266,948
[45] Date of Patent: Nov. 30, 1993

[54] APPARATUS AND METHOD FOR DISPLAYING A TRAVEL POSITION

[75] Inventor: Yoshiyuki Matsumoto, Saitama, Japan

[73] Assignee: Honda Giken Kogyo Kabushiki Kaisha, Tokyo, Japan

[21] Appl. No.: 798,962

[22] Filed: Nov. 27, 1991

[30] Foreign Application Priority Data

Nov. 28, 1990 [JP] Japan .................. 2-327103

[51] Int. Cl.⁵ ............................ G08G 1/123
[52] U.S. Cl. .................. 340/995; 73/178 R; 340/990; 364/449
[58] Field of Search ......... 340/995, 988, 990, 905; 73/178 R; 364/449, 460, 444

[56] References Cited

U.S. PATENT DOCUMENTS

| | | | |
|---|---|---|---|
| 4,926,336 | 5/1990 | Yamada | 340/995 |
| 4,963,864 | 10/1990 | Iihoshi et al. | 340/995 |
| 5,003,306 | 3/1991 | Takahashi et al. | 340/990 |
| 5,043,902 | 8/1991 | Yokoyama et al. | 73/178 R |
| 5,046,011 | 9/1991 | Kakihara et al. | 340/990 |
| 5,146,219 | 9/1992 | Zechnall | 340/995 |

FOREIGN PATENT DOCUMENTS

| | | | |
|---|---|---|---|
| 0041998 | 2/1989 | Japan | 340/995 |
| 0276014 | 11/1989 | Japan | 340/995 |
| 0017406 | 1/1990 | Japan | 340/995 |

Primary Examiner—Brent Swarthout
Attorney, Agent, or Firm—Lyon & Lyon

[57] ABSTRACT

Disclosed is an apparatus for displaying a travel position, which, in carrying out steps of calculating X- and Y-coordinates of a current position of the moving body; renewably presents said current position on a road map indicated on a display screen; matches between a travel trace pattern formed by subsequent current positions and each road pattern on the road map; and puts the travel trace on the mated road pattern for correction of the current position of the moving body deviated from the road on the map, to determine what class of the road the moving body is running on, e.g. mountain road, superhighway or other ordinary road, and also changes the pattern matching condition to be adapted for the class of the road, as determined by a measured number of curves per unit of distance.

6 Claims, 6 Drawing Sheets

FIG.11

APPARATUS AND METHOD FOR DISPLAYING A TRAVEL POSITION

BACKGROUND OF THE INVENTION

The present invention relates to an apparatus for displaying a travel position, which is capable of indicating the current position of a moving body on a road map presented on a screen.

Recently, in an attempt to guide a moving body, e.g. an automobile, an apparatus for displaying the current position of a moving body has been developed, in which the current position of the automobile is sequentially estimated in terms of X- and Y-coordinates by carrying out algorithmic operations on the automobile's running distance and travel direction, determined by an associated distance meter and direction sensor respectively, and the current position thus estimated is indicated in the form of a dot on a road map appearing on a screen.

However, such apparatus cannot be free from cumulation of errors in determining the running distance and direction of the automobile, which will result in an incorrect indication of the automobile's current position. For instance, an incorrect current position will cause the display dot to depart from all roads on the driver's screen, so that the driver cannot determine the road on which his car is running. In this case deformation of the road map may also occur, resulting in disappearance of the display dot from the roads indicated on the screen.

Past attempts to solve this problem have proposed that a travel trace formed by sequentially renewed estimated current car positions thereon is compared with all road patterns on the screen to find a road having the most similar pattern and then the dot image of the last estimated current car position is corrected by putting it on the corresponding position on the selected road indicated on the screen.

However, the problem still remains that if the above-mentioned matching process is applied to all the roads with no consideration for their classification, e.g. mountain road, superhighway and other ordinary roads, it may have a decreased matching accuracy depending on the class of the road whereon the car runs.

For example, any mountain road is usually characterized by large undulations and a large number of curved portions. These are represented on road maps with less accuracy than that of a superhighway or other ordinary road and, furthermore, since the data on the map are digitized by linear approximation methods to be stored in a memory such as a CD-ROM type for road map information, the stored data may include an increased amount of errors in defining a road's meandering portion having a series of sharply turning courses.

Consequently, when a car is travelling along a mountain road, it is much more difficult to make the car travel trace match the road patterns obtained on the basis of digitally processed data and displayed on the screen.

SUMMARY OF THE INVENTION

In view of the foregoing, the present invention was made to provide an apparatus for displaying a current position of a moving body, which, in case the moving body departs from all the roads indicated on the road map screen, can accurately correct its current position on the screen by optimally performing an adaptive pattern matching between the travel trace and the pattern of a road wherealong the moving body is travelling, in due consideration of the accuracy of the road map based on the digitized data of the road depending upon its category, e.g., mountain road, superhighway or other ordinary road.

DESCRIPTION OF THE PREFERRED EMBODIMENTS

The present invention proposes an apparatus for displaying a travel position which is capable of recognizing the class of a roadway whereon the moving body is running and selecting pattern matching conditions, including various kinds of parameters and threshold values, in accordance with the recognized class of the road.

Figure 1:
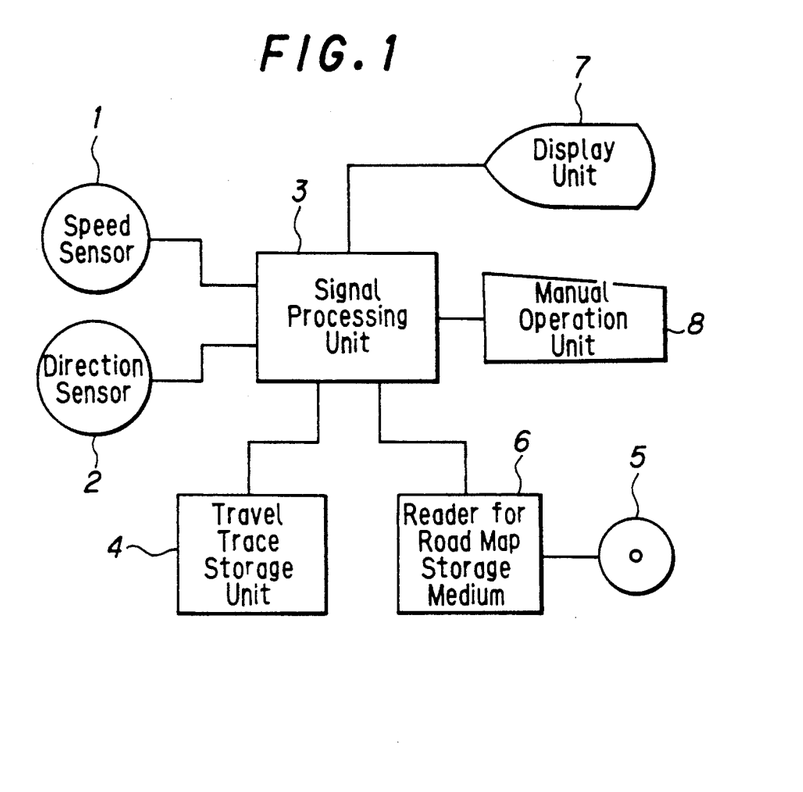
FIG. 1 is a block diagram showing a structure of an apparatus for displaying the current position of a moving body according to the present invention.

Referring now to the drawings, a preferred embodiment of the present invention will be described in detail as follows:

It will be observed from FIG. 1 that a travel position displaying apparatus according to the present invention comprises: a speed sensor 1 for detecting a car's running speed; a direction sensor 2 which is capable of detecting any variation in angular speed in the yaw direction and generating a signal proportional to a change in direction of the car's motion; a signal processing unit 3 composed of a micro-computer which is capable of controlling the entire system, determining the running distance traveled by multiplying the running speed measured by the speed sensor 1 by the time elapsed, determining a change in the running direction of the car by multiplying the angular speed detected by the direction sensor 2 by the time elapsed, and conducting a cumulative algorithmic operation of vectors to determine current car position in terms of X- and Y-coordinates for each unit running distance; a travel trace storage unit 4 for sequentially storing the X- and Y-coordinates of the current car positions as a finite continuous data set; a road map storage medium 5 for storing a plurality of road maps; a storage medium reading unit 6 for selectively reading different road maps; a display unit 7 for presenting a selected road map and the travel trace in terms of sequential current car positions and its running directions on an associated screen; a manual operating unit 8 for sending operation commands to the signal processing unit 3, including commands for selecting a desired road map, setting a starting position at a given point on the selected road map, selectively indicating a travel trace, turning the selected road map and/or the travel trace on the selected road map, shifting selected dots representing car positions on the road map, enlarging or reducing a selected area in the road map at a desired rate and performing other required operations.

Figure 2:
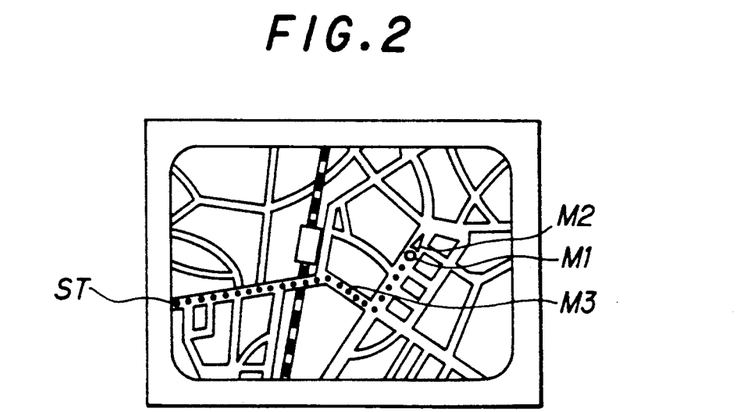
FIG. 2 shows an example of a road map image with a series of dots representing sequential current car positions appearing on a screen of the travel position displaying apparatus shown in FIG. 1.
Figure 3:
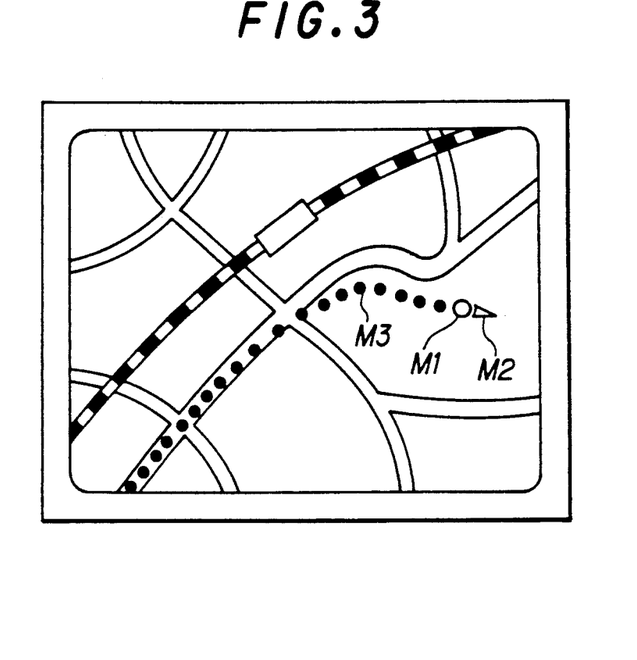
FIG. 3 shows another road map image having sequential current car positions departing from the road on the road map.

In operation of the thus constructed apparatus, a road map selectively read out from the road map storage medium 5 appears on the screen of the display unit 7, and current car positions are given sequentially by dotting on the selected road on the screen to indicate a travel trace which the car has already run while the signal processing unit 3 is carrying out the necessary algorithmic operations to renew the X- and Y-coordinates of a current car position in the travel trace storing unit 4 wherefrom said data is read out and sent to the display unit 7. Thus, as illustrated in FIG. 2, the screen of the display unit 7 shows the last estimated current car position M1, the direction M2 in which the car is about to run from the last estimated current car position, and sequential car positions M3 plotted one after another from the starting position ST.

The arrangement and operation described so far are the same as the conventional travel position displaying apparatus, described above.

In the conventional travel position displaying apparatus, positioning errors are apt to cumulate as the car runs a relatively long distance. Accordingly, the travel trace will continue to increasingly deviate from the selected road on the road map until the car is no longer on the road map on the screen.

Such a travel position displaying apparatus is improved according to the present invention, wherein the travel trace having sequential and last estimated current car positions thereon is corrected and put in registration with the true road, found by selecting the road or roads in vicinity of the last estimated current car position and conducting the pattern-matching procedure between the travel trace and each of the selected roads. Specifically, the number of selected roads with respect to which the travel trace is to be checked for similarity is reduced to a minimum, but is still adequate to permit the selection of the true road and the exact location of the car on the road map. Thus, the burden of pattern-matching, in the signal processing unit, is reduced to a minimum.

An example of a selection of a road is described as follows:

The presumed current car position is set on the road, and on all branches, respectively, whereon the car is supposed to run a predetermined distance ahead from the starting position or from the last estimated and corrected current car position on the road map on the screen.

Figure 4A:
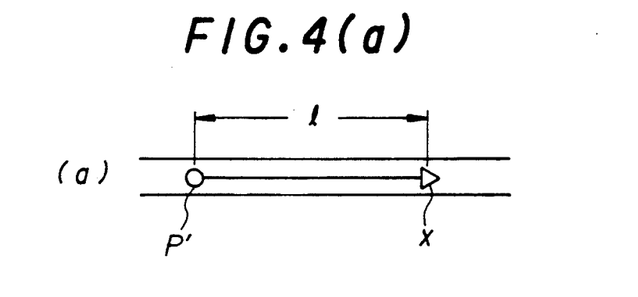
FIGS. 4(a) and 4(b) show how presumed current car positions are put on a road and road branches for each increment of running distance, respectively.
Figure 4B:
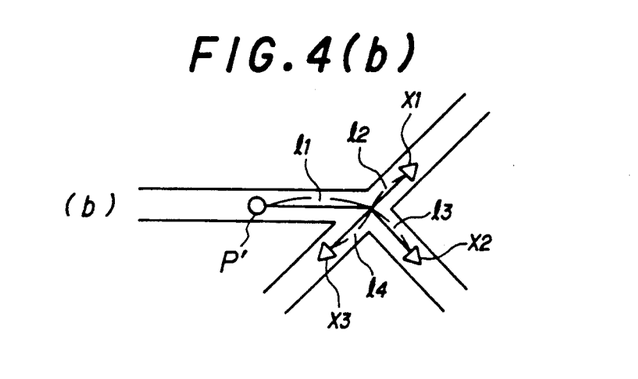

Referring to FIG. 4(a), if the car is running on a straight road having no branches, within a predetermined distance l from the last current car position P', corrected by the pattern-matching procedure, the subsequent presumed current position X is set at the predetermined distance l ahead of the last current car position on the same road. Referring to FIG. 4(b), if the car is running on a straight road having branches, within a predetermined distance l from the last current car position P', corrected by the pattern-matching procedure, the subsequent presumed current positions X1, X2, and X3 are set at the predetermined distance l ahead of the last current car position P' on all the branches (where l1+l2=l1+l3=l1+l4=l).

Each time it is detected that the car ran a given constant distance l, the signal processing unit 3 carries out the necessary algorithmic operation with reference to the coordinates of the position of the selected road appearing on the screen of the display unit 7 to automatically put presumed current car positions on the road. Each road on the road map is represented by a series of line segments obtained by linear approximation and the digital values of X- and Y-coordinates of the road's line segments are stored in the road map storage unit 5.

Next, a decision is made as to whether or not the distance between each of the presumed current car positions and the last estimated current car position which deviates from all the roads is within a given allowance. If the road or roads are within such allowance, then the presumed current car positions, being within such allowance, are selected and will be subjected to pattern-matching.

Figure 5:
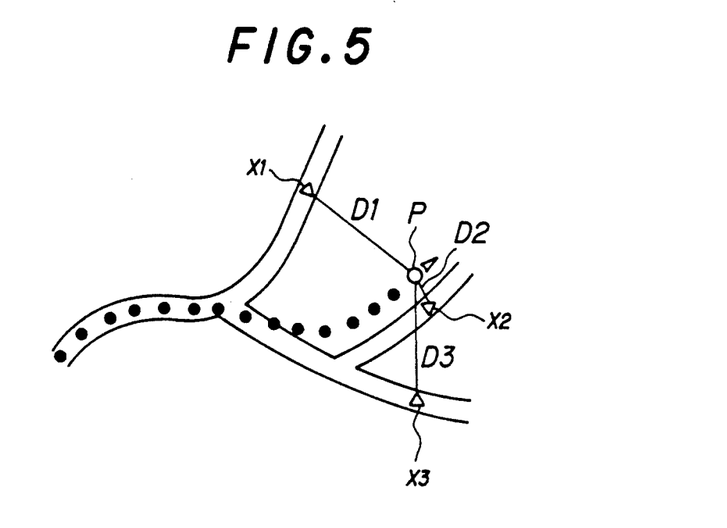
FIGS. 5 shows how the last estimated car position is related to corresponding presumed current car positions on the road map.

Referring to FIG. 5, the distances between presumed current car positions X (X1, X2 and X3) and the estimated current car position P are indicated as D (D1, D2 and D3).

Presumed current car positions which meet the following equation (1) are estimated.

$$D \leq \alpha l = M \qquad (1)$$

where "l" stands for a unit distance set, for instance, at 100 meters; "M" stands for a predetermined allowance, for instance 50 meters; and "α" stands for a coefficient pertaining to the accuracy of the car positioning with reference to running distance as a parameter and set, for instance, at 5%.

Referring to FIG. 5, if the presumed current car position X2 is selected as that meeting the equation (1), the road whereon the presumed current car position X2 exists will be "nominated" for pattern matching.

Later, each time the car ran the predetermined distance l, the above-mentioned selection of the presumed current car position X beginning is repeated.

Figure 6:
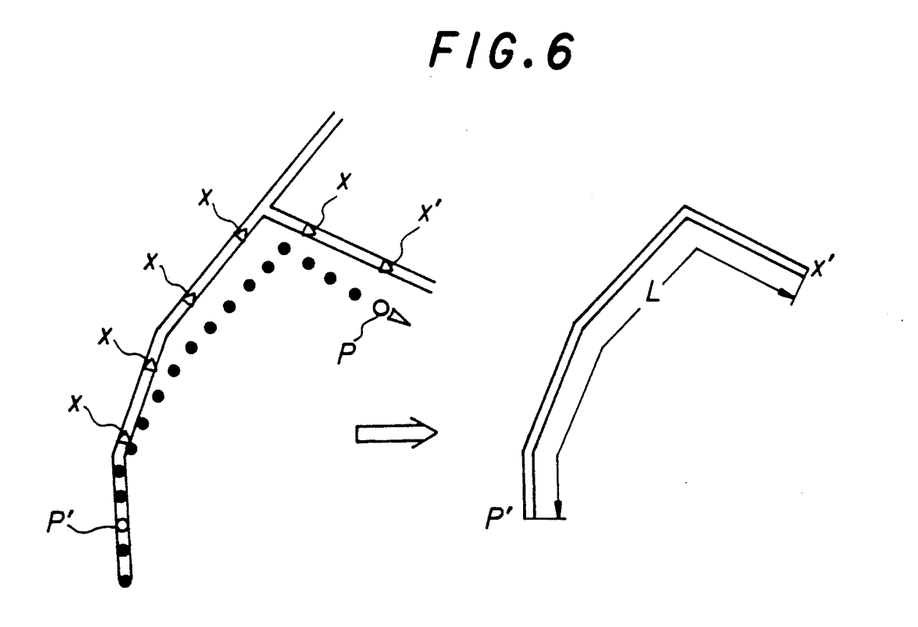
FIG. 6 shows how a road pattern to be nominated for pattern matching is formed.

Referring to FIG. 6, the road nominated for pattern-matching is presented in the form of a pattern of a constant length L which is formed of a series of thus selected presumed current car positions X from the position P'. The road pattern of a fixed length L is compared with the car's travel trace of the same fixed length L in the following pattern-matching process:

If the fixed length L of the pattern is short, a large number of road patterns similar to the trace pattern of the car's travel may be found on the road map, increasing the possibility of erroneous selection, while if the fixed length L is long, the possibility of erroneous selection can be reduced but a large amount of data may be needed for pattern matching, thereby much time is required for data processing and also the capacity of the data processing and storing hardware shall be increased. Accordingly, the fixed pattern length L is usually set at a value between 600 to 800 meters.

Figure 7A:
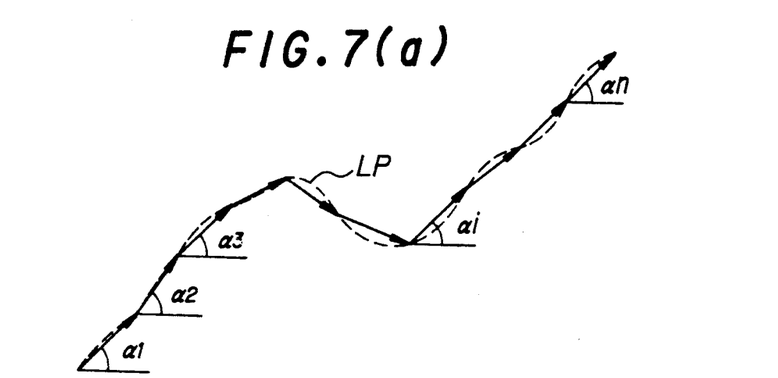
FIG. 7(a) shows how a travel trace approximation is made by using straight increments of equal length.
Figure 7B:
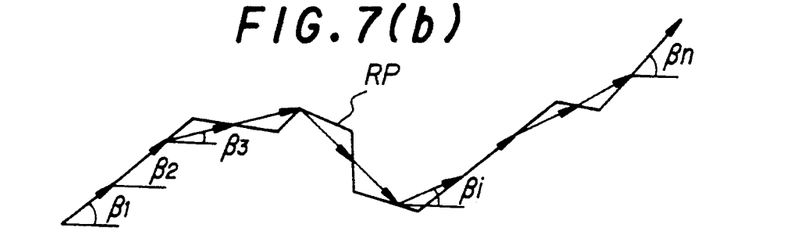
FIG. 7(b) shows how a selected road pattern approximation is made by using straight increments of equal length.

First, a trace pattern LP of the car travel and a nominated road pattern RP are converted into approximates of broken lines of equal length, for instance, 10 meters as illustrated in FIGS. 7(a) and 7(b) respectively, and then vectorial angles $\alpha_i$ (i=1, 2, 3, ... n) of approximated line segments of the travel trace LP and vectorial angles $\beta_i$(i=1, 2, 3, ... n) of approximated line segments of the nominated road pattern RP with respect to the X-axis are calculated.

A rotation angle $\theta$, of travel trace pattern RP, is determined by averaging differences $(\alpha_i - \beta_i)$ between angles of corresponding vectors of the trace and road pattern approximates.

$$\theta = 1/2 \left\{ \sum_{i=1}^{n} (\alpha_i - \beta_i) \right\} \quad (2)$$

where "n" stands for the number of vectors in the trace pattern LP and in the nominated road pattern RP.

Taking a road configuration error into consideration, pairs of vectors of the travel trace and road pattern, the angular difference of which is less than a predetermined threshold value A, are omitted before the rotation angle $\theta$ is calculated.

$$|\alpha_i - \beta_i| > A \quad (3)$$

Where "A" stands for a threshold value of angles between paired vectors, which is usually set at about 45°.

Figure 8:
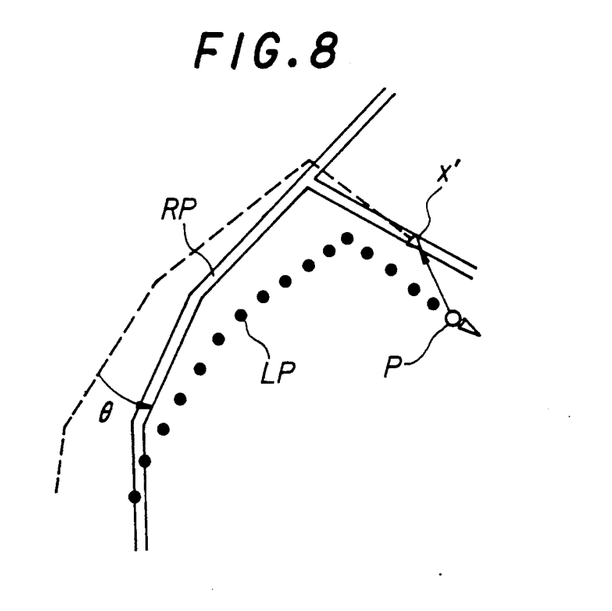
FIG. 8 shows how a travel trace and a selected road pattern are matched to each other.

Second, as illustrated in FIG. 8, the travel trace pattern LP is shifted in parallel with the nominated road pattern RP until the current car position P at the head of the travel trace reaches to the last presumed current car position x' at the head of the road pattern RP, and then the travel trace pattern LP is turned about the current car position P by the angle $\theta$ so as to put it on the road pattern RP.

Figure 9:
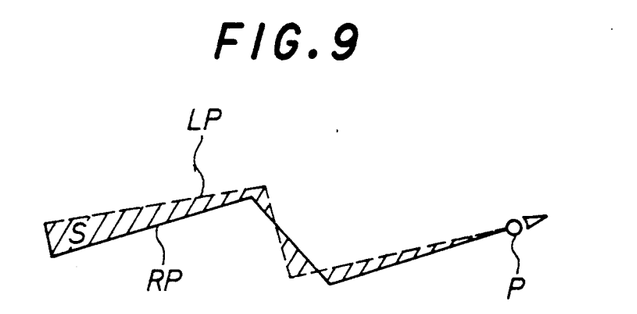
FIG. 9 shows a discrepancy between a travel trace and a road pattern when they are laid over each other in pattern matching process.

Referring to FIG. 9, an area S formed between two patterns after rotation of the trace pattern LP by $\theta$ is calculated. The smaller the area S is, the more similar both patterns are. Both patterns are considered to match with each other if a value S/L which stands for the area S normalized by the given fixed length L of the area S is less than a predetermined threshold value C of similarity.

$$(S/L) < C \quad (4)$$

The threshold value C for judging similarity of patterns is usually set at about 8.

Figure 10:
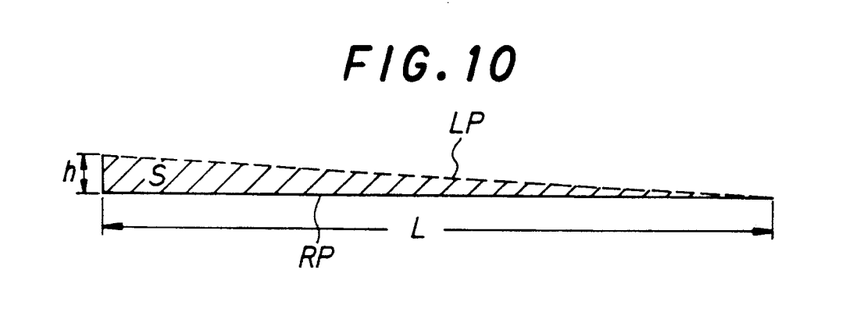
FIG. 10 shows an equivalently illustrated discrepancy between a travel trace and a selected road pattern when they are laid over each other in a pattern matching process.

Referring to FIG. 10, the condition (S/L)<8 means that when both the travel trace pattern LP and the nominated road pattern RP are converted into straight lines respectively and the area S formed between both these linear patterns is determined by approximately calculating S=h·L/2, the value "h" will be less than 16, i.e. the maximum deviation between both patterns is less than 16 meters.

Finally, data on the current car position P are corrected so as to make the current car position P appear at a position x' on the nominated road pattern RP subjected to the pattern-matching process, and also data on the travel trace pattern LP are corrected so as to bring the travel trace pattern onto the matched nominated road pattern RP if need be.

If the same matching conditions such as pattern length L, threshold value A of angular variation, threshold value C of pattern similarity etc., are applied to all cases of matching between the trace and road patterns, the matching accuracy may be decreased, for instance, when the car is running along a mountain roadway having meandering portions which have a decreased accuracy of digital map representation.

Namely, any meandering portion of the mountain roadway may have a large amount of error in digital mapping, by a linear approximation method, in comparison with other portions of the same roadway. Therefore, if a road pattern of a given fixed length L for a meandering portion is extracted from the digital map, said pattern may largely deviate from the travel trace pattern of a given fixed length L formed by the car running the meandering portion, thereby the pattern-matching may not be performed.

In case of a superhighway, since it has a small number of curved portions and can be digitally mapped with high accuracy, namely, with less of an error in linear approximation in comparison with ordinary roads in a city, it is possible to further improve the matching accuracy by employing matching conditions adapted for a superhighway.

In view of the foregoing, the travel position displaying apparatus according to the present invention includes means for determining what class of road the car is running on, and means for changing pattern matching conditions, including parameters and reference values, in accordance with the road discrimination result.

The means for changing the pattern matching conditions will be described as follows:

(1) Programs, each of which have a given algorithm including matching condition including a set of parameters and threshold values necessary for matching between a travel trace pattern and a road pattern and optimally adapted for road classification, are stored in a memory unit and will be selectively read out to use;

(2) Sets of matching, conditions, each of which includes a set of parameters and threshold values necessary for matching between a travel trace pattern and a road pattern and optimally adapted for road classification, are stored in a memory unit and will be selectively read out to use.

The means for determining what class of road the car is running on are included in the signal processing unit 3 and the determination procedure is carried out as follows:

First, each of the line segments of equal length, by which the car travelling trace of a constant length L is linearly approximated, has an angle $\alpha$ to the X-axis, i.e.

$$\alpha_i = \{\alpha_1, \alpha_2, \alpha_3, \ldots \alpha_n\}$$

which is differentiated numerically to the 2-nd order with respect to $\alpha_i'' = \alpha_{i+2} - 2\alpha_{i+1} + \alpha_i$, then $\alpha_i'' = \{\alpha_1'', \alpha_2'', \alpha_3'', \ldots \alpha_n''\}$ is obtained.

The frequency of changing a sign of each element in $\alpha_i'' = \{\alpha_1'', \alpha_2'', \alpha_3'', \ldots \alpha_n''\}$, i.e. the number k of inflection points on the travel trace pattern is counted, which is normalized by the trace length L, thereby obtaining:

$$k' = k/l \quad (5)$$

where k' stands for the number of curves per unit distance.

Next, the measured value k' of the road is compared with a threshold value K for determining whether the road is mountainous or not:

$$k' > K \ldots (6)$$

If the value k' is more than the value K, the road is judged to be mountainous. If the value k' is smaller than the value K, the road is judged to be of ordinary class. The value K is set at about 0.02.

Figure 11:
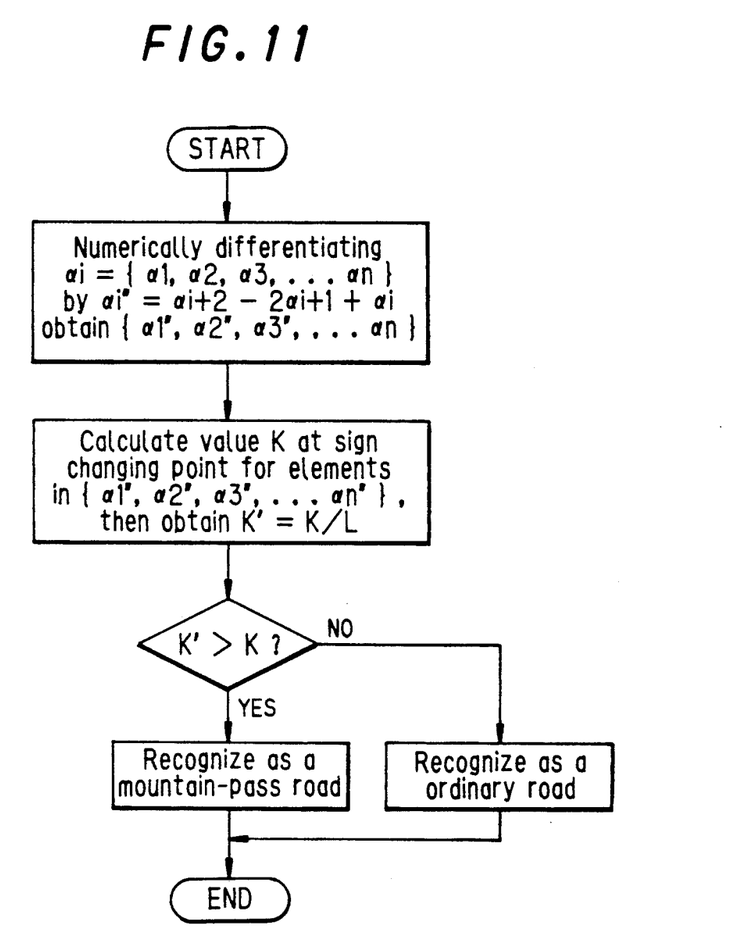
FIG. 11 is a flow chart showing a procedure for recognizing the road classification.

FIG. 11 is a flowchart showing a procedure for determination of the road classification.

The means for changing the pattern matching condition in response to the result of determination of the classification of the road are provided in the signal processing unit 3 wherein the procedure will be performed in the following way:

If the road is judged to be of the ordinary class the signal processing unit will employ standard preset values for the pattern matching procedure, that is, a common constant pattern length L=600-800 meters for the travel trace pattern LP and nominated road pattern RP, a threshold value A=45° for angular difference and a threshold value C=8 for similarity of patterns.

If the road is judged to be of the mountain-pass class the signal processing unit changes the values of a parameter (L) and thresholds (A, C) to those optimally adapted for mountain road pattern matching. Namely, since in case of a meandering portion of the mountain road a larger distance error is induced as pattern length L is increased, this parameter is modified to have a value of L'=L×0.5 so as to shorten both the trace pattern LP and the road pattern RP to be compared with each other.

However, the value L' is set at 600 meters if L'<600 m or it is set at 3000 meter if L'>3000 m.

In the case of the mountain road, since there is a considerable variation of differences between angles of compared pairs of line segments of equal length, by which the travel trace pattern LP and the nominated road pattern RP are approximated respectively in the form of a broken line, the threshold value A for angular deviation is changed from 45° to 90°.

Furthermore, in the case of the mountain road, since there is a large amount of the error in configuration of mapped road, the threshold value C for pattern similarity is changed from 8 to 10, so as to slacken the condition of similarity between the trace pattern LP and the road pattern RP.

Relating to the means for determining what class of road the car is running on, it is also possible to employ a variety of other methods such that, for example, a dispersion of angular differences of compared pairs of line segments of equal length, for approximating the trace pattern into a broken line is processed statistically to recognize class of the road.

It is also possible to adopt a variety of algorithms, other than the fore-described, for pattern matching procedures and, accordingly, to apply a variety of pattern matching conditions, which include parameter and threshold values, to be changed in accordance with the road classification, and which are also selectable depending upon the selected algorithm.

It is also possible to prepare and selectively use a plurality of algorithms each of which is optimally adapted to a specified class of roads, e.g. mountain-pass road, superhighway or other ordinary road.

As is apparent from the foregoing description, the travel position displaying apparatus according to the present invention, offers the advantage that, in matching between a travel trace pattern and a nominated road pattern on a road map, so as to correct a current car position deviated from the road indicated on the map, it is possible to apply means for determining what class of road the car is running on and means for changing the matching condition including parameters and threshold values necessary for pattern matching to be adaptable to the class of road, e.g. mountain road, superhighway and other ordinary road, taking into consideration that different classes of roads differ from each other in their digital mapping accuracy.

What is claimed is:

1. An apparatus for displaying a travel position comprising:
    (a) means for detecting a running distance travelled and a running direction of a moving body;
    (b) means for calculating X- and Y- coordinates of a current position of said moving body;
    (c) means for renewably presenting, on a display screen, the current position of said moving body on a road map read out from a road map storage medium;
    (d) means for accumulating data, in a memory device, on subsequent current positions of said moving body to form data on a travel trace;
    (e) means for matching between a travel trace pattern of said moving body and a selected road pattern by means of a given algorithm;
    (f) means for putting the travel trace on the road pattern for correcting the current position of said moving body deviated from the road on the map;
    (g) means for determining what class of road the moving body is running on by measuring a number of curves per unit distance; and
    (h) means for changing a pattern matching condition, including parameters and thresholds usable in the algorithm according to the result of a road class determination.

2. The apparatus for displaying a travel position of claim 1 further comprising: means for selectively using a plurality of algorithms, according to a result of said road class determination, each of which includes a pattern matching condition, including parameters and thresholds set for a specific class of roads.

3. The apparatus for displaying a travel position of claim 1 further comprising: means for selectively using a plurality of pattern matching conditions, according to a result of said road class determination, each of which includes parameters and thresholds set for a specific class of roads.

4. A machine implemented process for displaying a travel position comprising the steps of:
    (a) detecting a running distance travelled and a changing direction of a moving body;
    (b) calculating X- and Y- coordinates of a current position of the moving body;
    (c) renewably presenting, on a display screen, the current position of the moving body on a road map read out from a road map storage medium;
    (d) accumulating data, in a memory device, on subsequent current positions of said moving body to form data on a travel trace;

(e) matching between a travel trace pattern of the moving body and a selected road pattern by means of a given algorithm;
(f) putting the travel trace on the road pattern for correcting the current position of said moving body deviated from the road on the map;
(g) determining what class of road the moving body is running on by measuring a number of curves per unit distance; and
(h) changing a pattern matching condition, including parameters and thresholds usable in the algorithm according to the result of a road class determination.

5. The machine implemented process of claim 4 wherein a plurality of algorithms are selectively used according to the result of the road class determination, and further wherein each algorithm used includes a pattern matching condition, including parameters and thresholds set for a specific class of roads.

6. The machine implemented process of claim 4 wherein a plurality of pattern matching conditions is selectively used according to the result of the road class determination, and further wherein, each pattern matching condition used includes parameters and thresholds set for a specific class of roads.

* * * * *